(12) United States Patent
Sleijpen et al.

(10) Patent No.: US 7,987,699 B2
(45) Date of Patent: Aug. 2, 2011

(54) PNEUMATIC ASSEMBLY FOR A PRESSURE DECAY TESTER

(75) Inventors: Stephen John Sleijpen, Balmain (AU); Joseph Tharion, Balmain (AU); Jan Waszczuk, Balmain (AU); Eric Patrick O'Donnell, Balmain (AU); William Granger, Balmain (AU); David Bernardi, Balmain (AU); Stephen Richard O'Farrell, Balmain (AU); Jason Mark Thelander, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 533 days.

(21) Appl. No.: 12/193,727

(22) Filed: Aug. 19, 2008

(65) Prior Publication Data
US 2010/0043533 A1 Feb. 25, 2010

(51) Int. Cl.
*G01M 3/26* (2006.01)
(52) U.S. Cl. ............ 73/40.5 R; 73/40.7; 73/46; 269/20; 269/56; 269/153; 269/265
(58) Field of Classification Search ............ 73/40–49.8; 269/20, 56, 152, 153, 265
See application file for complete search history.

(56) References Cited

U.S. PATENT DOCUMENTS

| | | | | |
|---|---|---|---|---|
| 3,529,463 A * | 9/1970 | Kirchberger et al. | .......... | 73/49.2 |
| 3,762,212 A * | 10/1973 | Morley et al. | ................. | 73/40.7 |
| 3,822,585 A * | 7/1974 | Toback | .......................... | 73/49.2 |
| 4,356,721 A * | 11/1982 | White et al. | ................... | 73/40.7 |
| 4,553,435 A * | 11/1985 | Goldfarb et al. | ................ | 73/40.7 |
| 4,587,619 A * | 5/1986 | Converse et al. | ............... | 702/51 |
| 4,587,836 A * | 5/1986 | Hewlett | ......................... | 73/49.8 |
| 4,602,499 A * | 7/1986 | Norton et al. | ...................... | 73/41 |
| 4,715,214 A | 12/1987 | Tveter et al. | | |
| 4,893,499 A * | 1/1990 | Layton et al. | ................... | 73/49.3 |
| 5,736,998 A * | 4/1998 | Caren et al. | ....................... | 347/45 |
| 5,852,460 A * | 12/1998 | Schaeffer et al. | ............... | 347/87 |
| 5,910,810 A * | 6/1999 | Brooks et al. | .................... | 347/88 |
| 5,984,464 A * | 11/1999 | Steinfield et al. | ............... | 347/87 |
| 6,179,414 B1 * | 1/2001 | Keefe et al. | ...................... | 347/65 |
| 6,224,198 B1 | 5/2001 | Cook et al. | | |
| 6,279,383 B1 * | 8/2001 | Balke et al. | ........................ | 73/40 |
| 6,286,941 B1 * | 9/2001 | Courian et al. | .................. | 347/65 |
| 6,393,896 B1 * | 5/2002 | Fan | ..................................... | 73/40 |
| 6,662,634 B2 | 12/2003 | Lehmann | | |
| 6,826,957 B2 | 12/2004 | Martone et al. | | |
| 6,874,872 B2 * | 4/2005 | Lewis et al. | ..................... | 347/85 |
| 7,174,772 B2 | 2/2007 | Sacca | | |
| 7,182,423 B2 * | 2/2007 | Su et al. | ........................... | 347/19 |
| 2005/0122352 A1 * | 6/2005 | Su et al. | ............................. | 347/6 |

* cited by examiner

Primary Examiner — David A. Rogers

(57) ABSTRACT

A pneumatic assembly for a pressure decay tester of printhead integrated circuits includes a pressurized air supply. A pneumatic clamping arrangement is in fluid communication with the pressurized air supply for clamping a carrier for the printhead integrated circuits such that the carrier is in fluid communication with the printhead integrated circuits. A valve arrangement applies a predetermined pressure to the carrier. A sensing arrangement senses a static pressure in the carrier. A control system is in communication with the clamping, valve and sensing arrangements to control operation thereof and to generate a discernible signal representing said static pressure such that a decay in said static pressure can be determined.

7 Claims, 12 Drawing Sheets

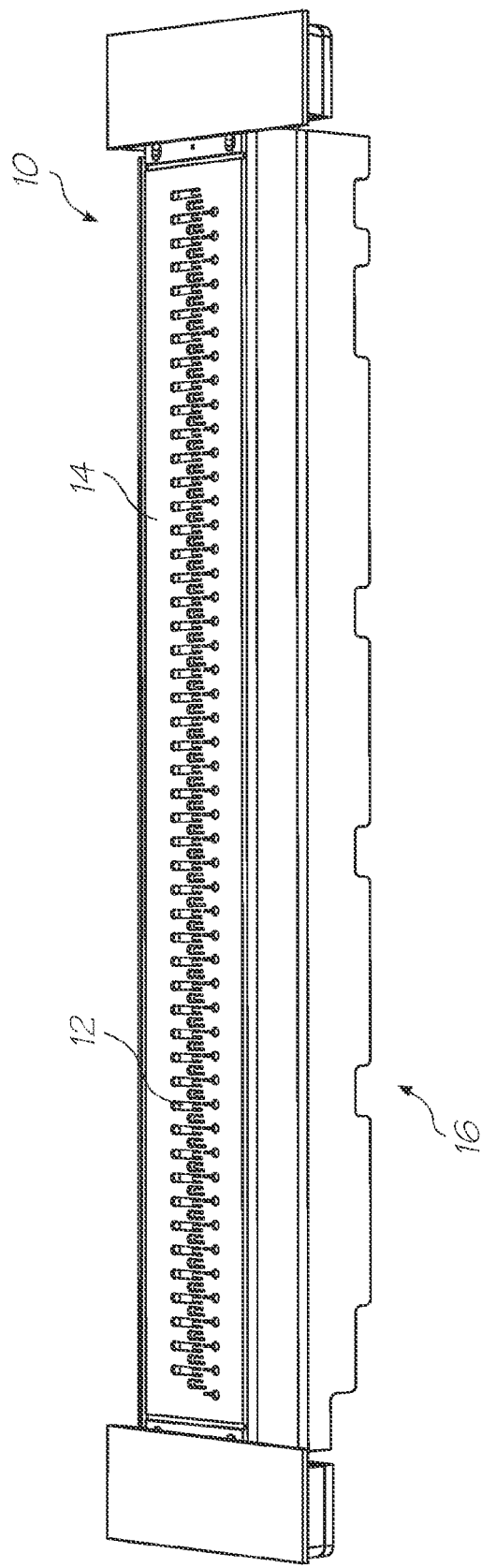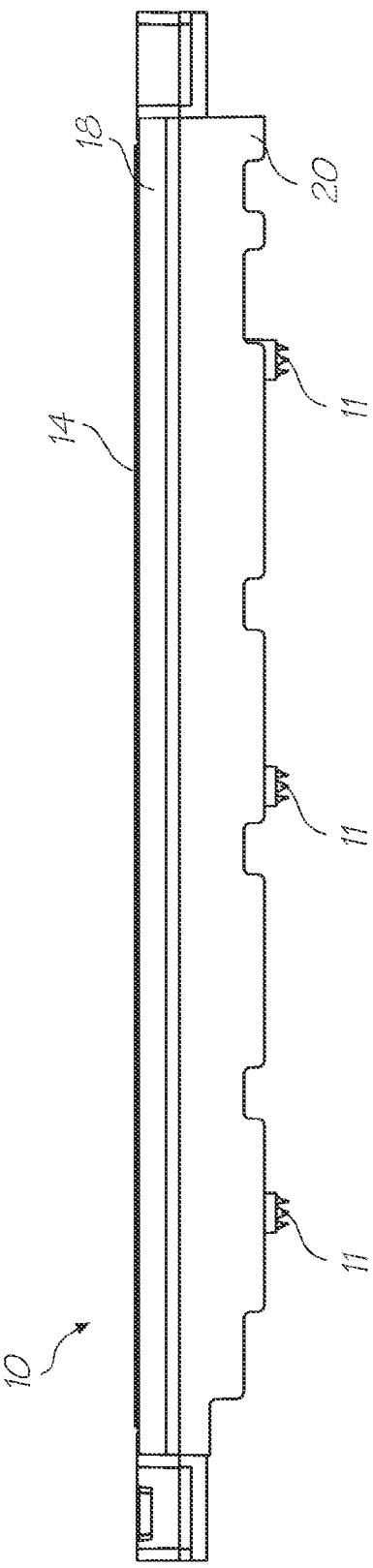
FIG. 1A
FIG. 1B

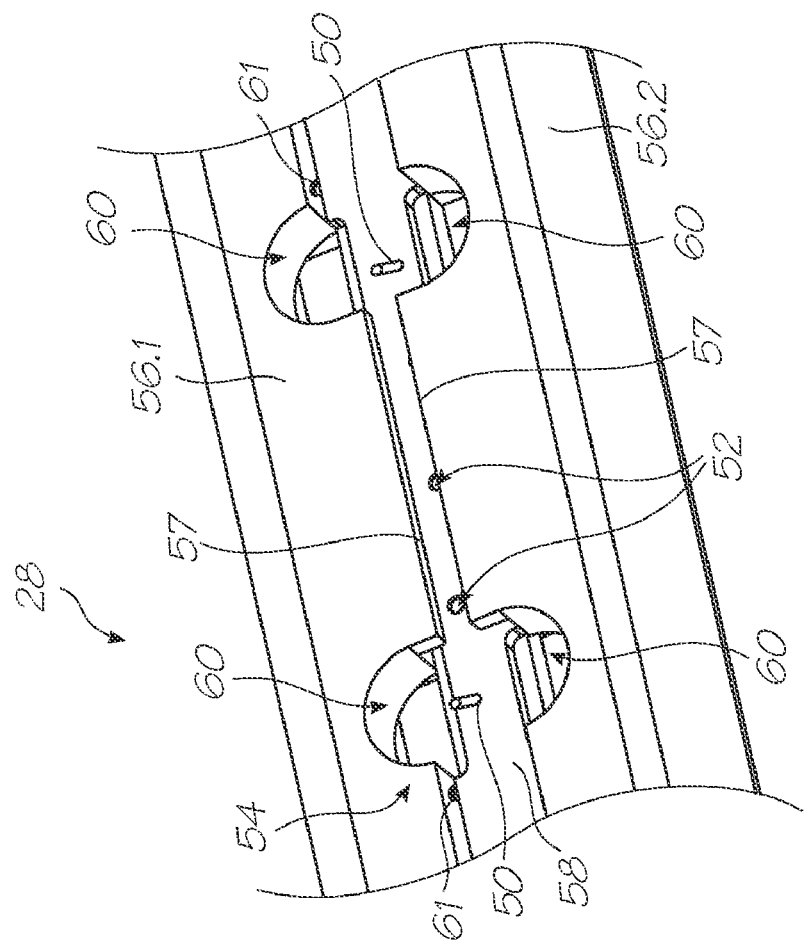
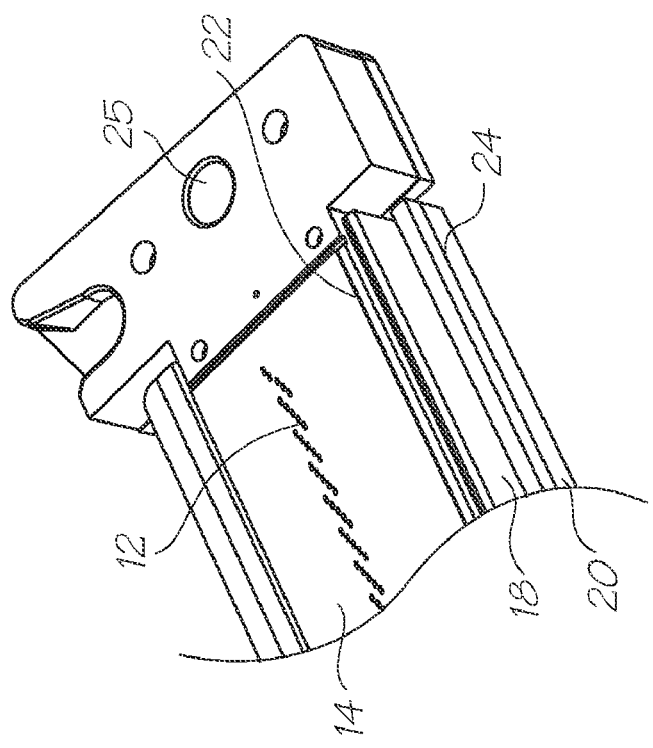
FIG. 4
FIG. 2

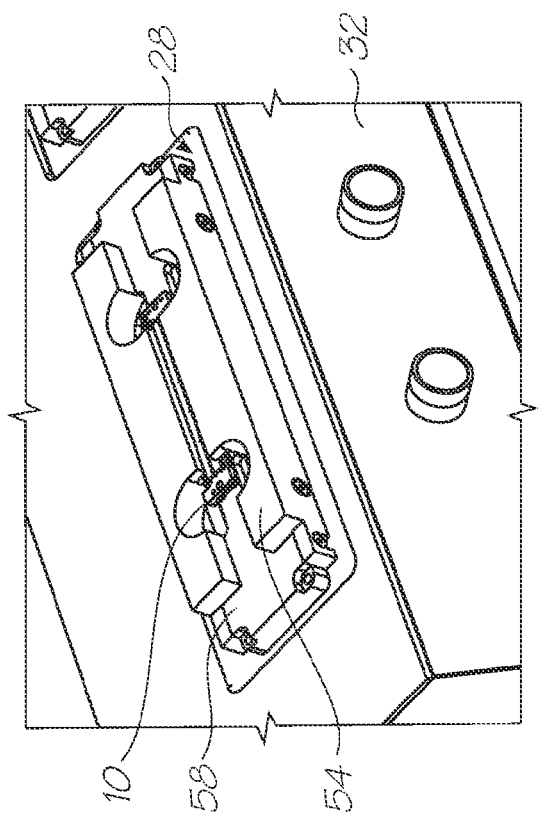
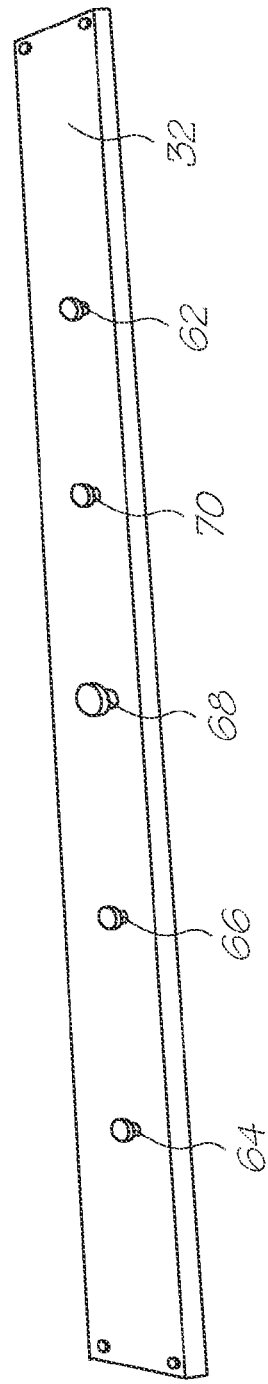

PNEUMATIC ASSEMBLY FOR A PRESSURE DECAY TESTER

FIELD OF INVENTION

This invention relates to the field of printer component testing, in general. More specifically, the invention relates to a leak tester for a carrier for printhead integrated circuits, a method for testing integrity of a base or carrier for printhead integrated circuits, a safety system for a pressure decay tester for a printhead integrated circuit carrier, a cradle assembly for a pressure decay leak tester, and a pressure-based tester for testing an integrity of a platform assembly.

CO-PENDING APPLICATIONS

The following applications have been filed by the Applicant simultaneously with the present application:

12/193,715 12/193,716 12/193,717 12/193,718 12/193,719 12/193,720 12/193,721
12/193,722 12/193,723 12/193,724 12/193,725 12/193,726 12/193,728 12/193,729
12/193,730 12/193,731 12/193,732 12/193,733 12/193,734 12/193,735 12/193,736
12/193,737 12/193,738 12/193,739 12/193,740 12/193,741 12/193,742 12/193,743
12/193,745 12/193,747 12/193,748 12/193,750 12/193,751 12/193,753

The disclosures of these co-pending applications are incorporated herein by reference. The above applications have been identified by their filing docket number, which will be substituted with the corresponding application number, once assigned.

CROSS REFERENCES

The following patents or patent applications filed by the applicant or assignee of the present invention are hereby incorporated by cross-reference.

11/246,687 11/246,718 7,322,681   11/246,686 11/246,703 11/246,691 11/246,711
11/246,690 11/246,712 11/246,717 7,401,890   7,401,910   11/246,701 11/246,702
11/246,668 11/246,697 11/246,698 11/246,699 11/246,675 11/246,674 11/246,667
11/829,957 11/829,960 11/829,961 11/829,962 11/829,963 11/829,966 11/829,967
11/829,968 11/829,969 11,946,839 11,946,838 11,946,837 11,951,230 12,141,034
12,140,265 12,183,003 11/688,863 11/688,864 11/688,865 7,364,265   11/688,867
11/688,868 11/688,869 11/688,871 11/688,872 11/688,873 11/741,766 12,014,767
12,014,768 12,014,769 12,014,770 12,014,771 12,014,772 12,014,773 12,014,774
12,014,775 12,014,776 12,014,777 12,014,778 12,014,779 12,014,780 12,014,781
12,014,782 12,014,783 12,014,784 12,014,785 12,014,787 12,014,788 12,014,789
12,014,790 12,014,791 12,014,792 12,014,793 12,014,794 12,014,796 12,014,798
12,014,801 12,014,803 12,014,804 12,014,805 12,014,806 12,014,807 12,049,371
12,049,372 12,049,373 12,049,374 12,049,375 12,103,674 12,146,399

BACKGROUND

In order to ensure proper printing operation, it is important to test printhead integrated circuit prototypes prior to large-scale fabrication of the printhead integrated circuits.

Such testing can be carried out on some form of support assembly, base or carrier fabricated for testing purposes. In order for the testing to be accurate and properly indicative of the condition of the printhead assembly, the support assembly must meet minimum standards of integrity.

SUMMARY

According to a first aspect of the invention there is provided a leak tester for a carrier for printhead integrated circuits, said carrier having at least one fluid inlet in fluid communication with a plurality of fluid outlets via discrete fluid paths, the tester comprising:

a support assembly that includes at least one receptacle shaped and configured to receive at least one respective carrier;

a pressurized fluid supply arranged on the support assembly and configured to supply pressurized fluid to the fluid inlets, the pressurized fluid supply incorporating a sealing mechanism configured to engage the fluid inlets in a sealing manner;

a pressure measurement arrangement operatively arranged with respect to the pressurized fluid supply to measure pressure applied at the fluid inlets; and a controller operatively connected to the pressure measurement arrangement and pressurized fluid supply, the controller being configured to control the fluid supply to charge the carrier with pressurized fluid until a predetermined pressure is reached, and to monitor the pressure for a predetermined period of time.

Thus, this aspect of the invention provides a means for testing the integrity of a carrier in which printhead integrated circuits is to be tested. It will be appreciated that leakage between components of the carrier are indicated if the pressure monitored by the controller decays over a period of time.

The receptacles may include locators to locate the carriers in the receptacles prior to engagement of the sealing mechanisms with the fluid inlets. Each sealing mechanism may include a clamp arrangement for clamping about the fluid inlet.

The controller may include an operator interface arranged on the support assembly allowing an operator to control the tester. The interface may include indicators to indicate an operational status of the tester to an operator.

The pressurized fluid supply may include a pneumatic system mounted in the housing assembly, the pneumatic system including pneumatic circuits in fluid communication with respective receptacles, the pneumatic circuits each including a primary pressure regulator for primary regulation and a secondary pressure regulator for final regulation.

Each pneumatic circuit may include the pressure measurement arrangement in turn including a positive pressure sensor for sensing a system pressure and a number of compound pressure sensors to sense pressure at the sealing mechanism.

According to a second aspect of the invention there is provided a method for testing integrity of a base for printhead integrated circuits, the base having at least one fluid inlet in fluid communication with a plurality of fluid outlets via discrete fluid paths, said method comprising the steps of:

engaging the, or each, fluid inlet of the base to a fluid supply in a sealing manner;

charging the base with pressurized fluid until a predetermined pressure is reached; and monitoring the pressure in the base for a predetermined period of time, wherein a rate of pressure decay is indicative of an integrity of the base.

The fluid inlet may be engaged to a pneumatic system so that the base is charged with pressurized gas. The step of sealing may include clamping the fluid inlet to the fluid supply via a clamping arrangement.

The pressurized gas may be subjected to primary and secondary regulation substantially to neutralize the effect of supply pressure variations. The step of monitoring may include the step of sensing the pressure in the pneumatic circuit and generating a signal representing a value associated with the pressure.

The step of monitoring may include indicating data associated with said value to an operator.

According to a third aspect of the invention there is provided a pneumatic assembly for a pressure decay tester of printhead integrated circuits, the assembly comprising a pressurized gas supply;

a pneumatic clamping arrangement in fluid communication with the pressurized gas supply for clamping a carrier for the printhead integrated circuits such that the carrier is in fluid communication with the printhead integrated circuits;

a valve arrangement to apply a predetermined pressure to the carrier;

a sensing arrangement to sense a static pressure in the carrier; and a control system in communication with the clamping, valve and sensing arrangements to control operation thereof and to generate a discernible signal representing said static pressure such that a decay in said static pressure can be determined.

The pneumatic clamping arrangement may include a support on which the carrier is supported. The clamping arrangement may be configured so that, when actuated, the carrier is urged against the support.

The support may define gas supply openings in which gas inlet spouts of the carrier are received in use.

The valve arrangement may include an gas supply isolation valve operatively connected to the control system to isolate the gas supply openings from the pressurized gas supply during determination of said static pressure.

The sensing arrangement may include a pressure transmitter operatively connected to the control system to communicate pressure values upstream of the isolation valve to the control system.

The clamping arrangement may include pneumatic spout clamps positioned in the support to clamp the spouts in position.

The valve arrangement may include spout clamp valves operatively connected to the control system to control operation of the spout clamps.

According to a fourth aspect of the invention there is provided a cradle assembly for a pressure decay leak tester, said assembly operatively receiving a printhead integrated circuit carrier having a plurality of printing fluid paths defined therein, respective fluid inlets in fluid communication with respective fluid paths and a locating formation to facilitate correct location of the carrier on the tester, the assembly comprising:

at least one complementary locating formation for engaging the locating formation of the carrier;

at least one fluid outlet for charging the carrier with fluid via a respective fluid inlet of the carrier;

a clamping device for clamping the carrier to the fluid outlet, so that the integrity of the fluid paths is observable via pressure decay testing; and a control system operatively connected to the clamping device for controlling operation of the clamping device.

The clamping device may include two opposing coplanar clamp halves and said complementary location formation is a pair of spigots interposed between the clamp halves, so that actuation of the clamping device displaces the halves towards each other to embrace the carrier located on said spigots.

The clamping device may include a support plate, the spigots extending from the support plate. The clamp halves may be shaped to engage edges of the carrier and to urge the carrier against the support plate when the halves are displaced towards each other. The clamping device may include one of a pneumatic and a hydraulic actuator.

The clamp halves may each define digit recesses to facilitate manual insertion and removal of the carrier from the assembly. The control system may be configured to receive a particular signal from the tester and to deactivate the clamping device on receipt of said signal.

According to a fifth aspect of the invention there is provided a pressure-based tester for testing integrity of a platform assembly having a pair of assembled platform components fastened together and a fluid path extending into both components, the platform assembly suitable for supporting printhead integrated circuits to be tested, the tester comprising a housing assembly;

a regulated gas supply arranged in the housing assembly;

a retaining mechanism in fluid communication with the gas supply and configured to retain the platform assembly in fluid communication with the gas supply during testing of the platform assembly;

a pressure measuring apparatus operatively connected to the gas supply and configured to generate a signal corresponding to a pressure value applied to the retaining mechanism; and a control system configured to control operation of the regulated gas supply and the retaining mechanism and configured to receive the signal from the pressure measuring apparatus and to detect decay in the pressure value.

The control system may include a touch panel processing device operatively connected to the regulated gas supply, the retaining mechanism and the pressure measuring apparatus.

The touch panel processing device may be configured to generate a graphic user interface that displays pressure test results as a Cartesian plane graph with pressure and time on respective axes. The retaining mechanism may include a cradle assembly and a clamping mechanism to clamp the platform in the cradle assembly.

The cradle assembly may incorporate a pair of spaced manifolds arranged on the housing assembly and having outlets capable of engaging respective fluid paths of the platform assembly. The gas supply may include a pair of gas supply conduits and a pair of manifold isolation valves for connecting respective manifolds to the gas supply conduits.

The gas supply may include a system isolation valve, the pressure measurement apparatus being interposed between the system isolation valve and the manifold isolation valves.

According to a sixth aspect of the invention there is provided a software product for execution by a controller of a leak tester, as described above, said software product enabling the leak tester to perform a method having the steps of:

engaging the, or each, fluid inlet of the base to a fluid supply in a sealing manner;

charging the base with pressurized fluid until a predetermined pressure is reached; and monitoring the pressure in the base for a predetermined period of time, wherein a rate of pressure decay is indicative of an integrity of the base.

According to a seventh aspect of the invention there is provided a memory incorporating a software product, as described above.

Embodiments of the invention are now described, by way of example, with reference to the accompanying drawings. The following description is intended to illustrate particular embodiments of the invention and to permit a person skilled in the art to put those embodiments of the invention into effect. Accordingly, the following description is not intended to limit the scope of the preceding paragraphs or the claims in any way.

BRIEF DESCRIPTION OF THE DRAWINGS

In the accompanying drawings:

FIG. 1A shows, in side perspective view, a carrier for printhead integrated circuits for use with a leak or pressure decay tester, in accordance with one embodiment of the invention;

FIG. 1B shows a side view of the carrier of FIG. 1A.

FIG. 2 shows a close-up perspective view of a portion of the carrier shown in FIG. 1;

FIG. 4 shows a close-up view of a receptacle or cradle assembly, in accordance with one embodiment of the invention, of the leak tester shown in FIG. 3;

FIG. 5 shows a perspective view of the carrier of FIG. 1 located in the cradle of FIG. 4;

FIG. 6 shows an operator interface of the leak tester of FIG. 3;

DETAILED DESCRIPTION

Figure 3:
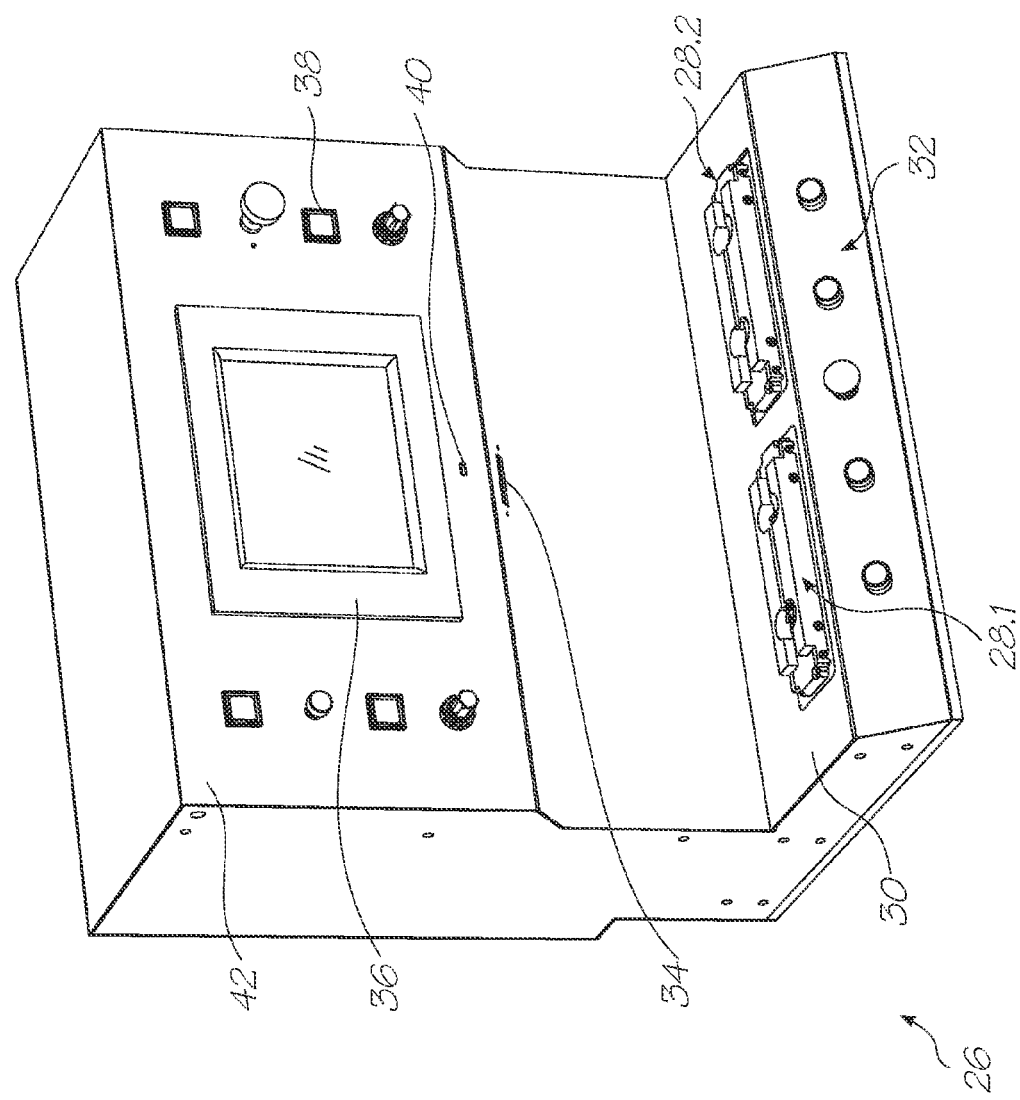
FIG. 3 shows a front perspective view of a pressure decay leak tester, in accordance with one embodiment of the invention.

Broadly, the invention provides a means to conduct pressure decay testing on a carrier 10 shown in FIG. 1. The carrier 10 is an assembly. It is therefore necessary to test the integrity of that assembly prior to carrying out tests on integrated circuits positioned on the assembly.

The carrier 10 generally includes a channel member 18 and a cover member 20 which are bonded to each other with an adhesive along a bond line 24 (FIG. 2). The members 18 and 20 define a number of ink paths or channels therethrough. These paths terminate as microscopic fluid outlets 12 which are used to supply a printhead integrated circuit (not shown) with printing fluid in operation.

The carrier 10 also includes a laminate 14, which defines laser ablated holes aligned with the fluid outlets 12. The laminate 14 is thermally bonded to the channel member 18, as shown, along a bond line 22. Fluid inlets or spouts 11 extend from the cover member 20. Locating or spigot apertures 25 (FIG. 2) discussed in more detail below are defined in respective ends of the carrier 10.

The purpose of the carrier 10 is to distribute printing fluids from a number of reservoirs via tortuous ink paths to the printhead integrated circuits. The printing fluids are fed, under pressure, into the carrier 10 via the spouts 11.

Before the printhead integrated circuits can be attached to the laminate 14, it is necessary to ensure that the members 18 and 20, as well as the laminate 14, are properly bonded and attached to prevent leakage of printing fluids. For this reason, the integrity of the bond lines 22, 24 should be tested or checked. One way of testing is to apply pressurized fluid to the carrier 10, via the spouts 11, to hold the pressure and to test pressure decay.

FIG. 3 shows one possible embodiment in accordance with the invention of a pressure decay leak tester 26 for testing the carrier 10. The Inventors have identified pressure decay testing as a suitable methodology for this purpose. In the embodiment shown, the tester 26 includes a housing assembly 42 which has a support assembly or platform 30 having a left receptacle or cradle assembly 28.1 and a right receptacle or cradle assembly 28.2, each, in accordance with one embodiment of the invention, for receiving the carrier 10. Each cradle assembly 28 is a retaining mechanism to receive and position the carrier 10.

It is to be appreciated that the tester 26 can have any number of receptacles or cradle assemblies 28. In the embodiment shown, the two cradle assemblies 28 allow, for example, simultaneous testing of two carriers 10, or continuous testing of carriers as one carrier can be tested whilst another is inserted into an unoccupied cradle assembly and prepared for testing.

The tester 26 also includes a controller or control system that includes a touch panel processing device 36, and an operator interface 32 located on the housing 42, as shown. The touch panel controller 36 and interface 32 allow an operator or user to control and operate the tester 26. The tester 26 also includes a number of indicators or gauges 38 to show an operational status of the tester 26. A barcode scanner or reader 34 is connected to the controller 36. It reads an identifier or barcode from the carrier 10 and communicates associated data to the controller 36. The rationale herefor is explained below.

In addition, the tester 26 also includes an interface, such as a USB interface, to allow the controller 36 to interface with a computer or other remote monitoring system (not shown).

FIGS. 4 and 5 show a cradle assembly 28 in more detail. In the embodiment shown, the cradle assembly 28 features a sealing, engagement or retaining mechanism 54 in the form of a clamp arrangement or clamping device having two opposing coplanar clamp halves 56.1 and 56.2, as shown. The cradle assembly 28 includes locators or locating formations in the form of a pair of spigots 50 interposed between the clamp halves 56. Each spigot 50 is received through a respective spigot opening 25 of the carrier 10 to locate the carrier 10 in the assembly 28.

The locating formations or spigots 50 engage the apertures 25 of the carrier 10, to ensure that the fluid inlets or spouts 11 of the carrier 10 are aligned with, and received in, respective fluid supply outlets or spout holes 52 of the cradle 28. The outlets 52 are used to charge the carrier 10 with pressurized fluid, in use. The clamping device 54 includes a support plate 58 with the spigots 50 extending from the support plate 58.

Pneumatically operated spout clamps (described in further detail with reference to FIG. 14) are positioned in the support plate 58 to clamp the spouts 11 in an airtight manner.

The clamp halves 56 have opposed bearing edges 57 that are shaped to engage edges of the carrier 10 and to urge said carrier 10 against the support plate 58 when the halves 56 are displaced towards each other. The clamp halves 56 each define digit recesses 60 to facilitate manual insertion and removal of the carrier 10 from the cradle 28.

The clamp halves 56 are connected to the plate 58 with pneumatic actuators 61 on each side of the plate 58. The pneumatic actuators 61 form part of a pneumatic circuit (FIG. 14), described in further detail below.

FIG. 6 shows a more detailed view of the operator interface 32. The interface 32 includes a start button to start a pressure decay test for each one of the cradles 28. These respective buttons are indicated by reference numerals 62 and 64. Also included is an emergency stop button 68, a reset button 70 which resets the tester 26, and a scan button 66 which activates the barcode scanner 34. The Inventor has found buttons manufactured by Sprecher & Schuh to be suitable for this application.

The emergency stop button 68 is a 40 mm, twist and pull-to-release, non-keyed, heavy duty operating button incorporating a normally closed switch. The reset button 70 is a flush, momentarily illuminated, blue lens push button having a normally open switch. The start buttons 62 and 64 are two flush, momentarily illuminated, green lens push buttons having normally open switches. The scan button 66 is similar, but has an amber lens.

Figure 7:
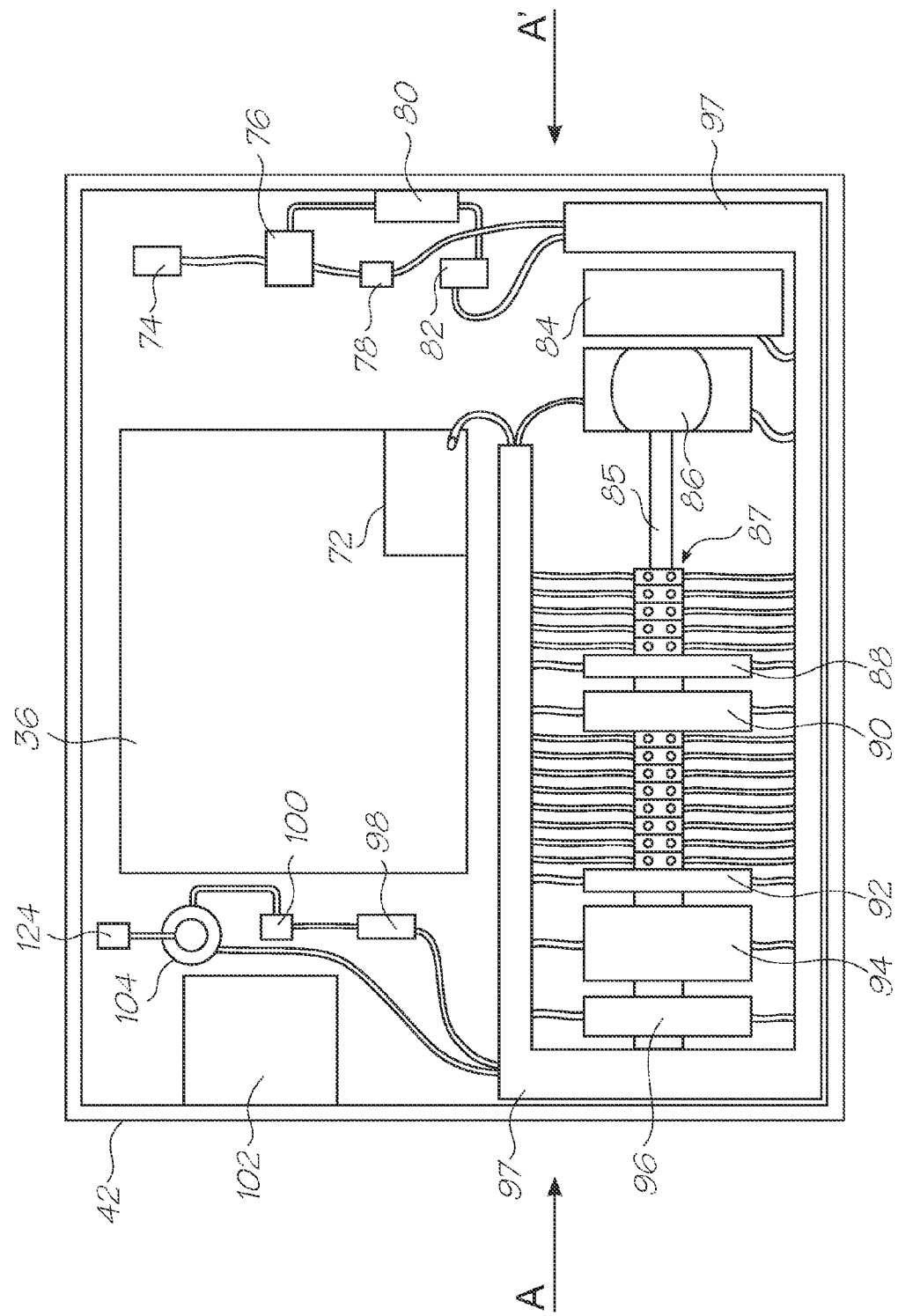
FIG. 7 shows a rear view of a housing of the leak tester of FIG. 3 with a service panel removed to reveal inner components.

A rear portion of the housing assembly 42 of the tester 26 is shown in FIG. 7 with a service panel removed to show the inner workings thereof. The controller 36 and associated pressurized fluid supply components are shown in more detail.

As shown, the tester 26 includes the touch panel controller 36 which has an integrated processor to process the necessary instructions to control and operate the components of the tester 26. The Inventor has found that the Advantech™ PPC-123T touch screen display including an Intel™ Pentium™ III processor is suitable for the application. The controller 36 uses a PCMCIA data acquisition card 72 coupled with a dedicated breakout board 84 to interface the card 72 with precision pressure sensors located in the respective cradles 28. The board 84 typically includes a precision resistor per sensor, i.e. two resistors for the embodiment shown.

It is to be appreciated that trunking 97 is provided to facilitate the connection of the relevant electrical and/or pneumatic components. As shown, trunking 97 forms a channel or conduit for electrical and pneumatic wires and lines. Further shown are rail 85 and connector blocks 87 to facilitate the interconnection of electrical components.

The tester 26 further includes digital input-output modules 86. The Inventor has found three ADAM-4055™ modules manufactured by Advantech™ to be suitable for this purpose. These modules 86 include an isolated converter to convert RS-232 signals from the controller 36 into isolated RS-422 or RS-485 signals without having to change the controller's hardware or software. The Inventor has identified Advantech™ model ADAM-4520 as a suitable unit.

The embodiment of the tester 26 shown includes two power supplies to power the different components. Reference numeral 102 refers to a DC power supply unit which is an AC/DC switching power supply unit with a single output and remote open sense lead protection features. The Inventor has found the Condor International Plus Series 24V Dc power supply to be suitable. In addition, reference numeral 94 indicates a primary switched-mode power supply unit used in the embodiment shown. The Inventor has found the Phoenix Contact 24V DC 2A (MINI-PS-100-240AC/24DC/2) model suitable for this application.

Also included is a safety relay 90, and three solid state relays 88, two applied to isolate a pneumatic system of the tester, and the third to allow the controller 36 to activate or deactivate the barcode scanner 34. The Inventor has found the Omron™ G92002 relay suitable for the safety relay 90, and Weiland™ Flare 24V DC terminal relays suitable for the solid state relays, as shown.

The tester 26 also includes a residual current circuit breaker 96 as a safety feature. The breaker 96 provides over current protection and earth leakage protection. The breaker 96 is generally a single pole unit with a switched neutral which detects an AC residual current while also having an earth fault indication window with a trip free mechanism. The Inventor has found the Hager™ AD810T residual current circuit breaker suitable for the task.

The barcode scanner 34 is located at the front of the tester 26 so that an operator can scan a barcode of the carrier 10 prior to inserting the carrier 10 into the cradle assembly 28. The Inventor has found the IT3900 barcode scanner manufactured by Hand Held Products Inc. to be suitable for this application. Also included are fuses 92 for safety reasons.

Figure 11:
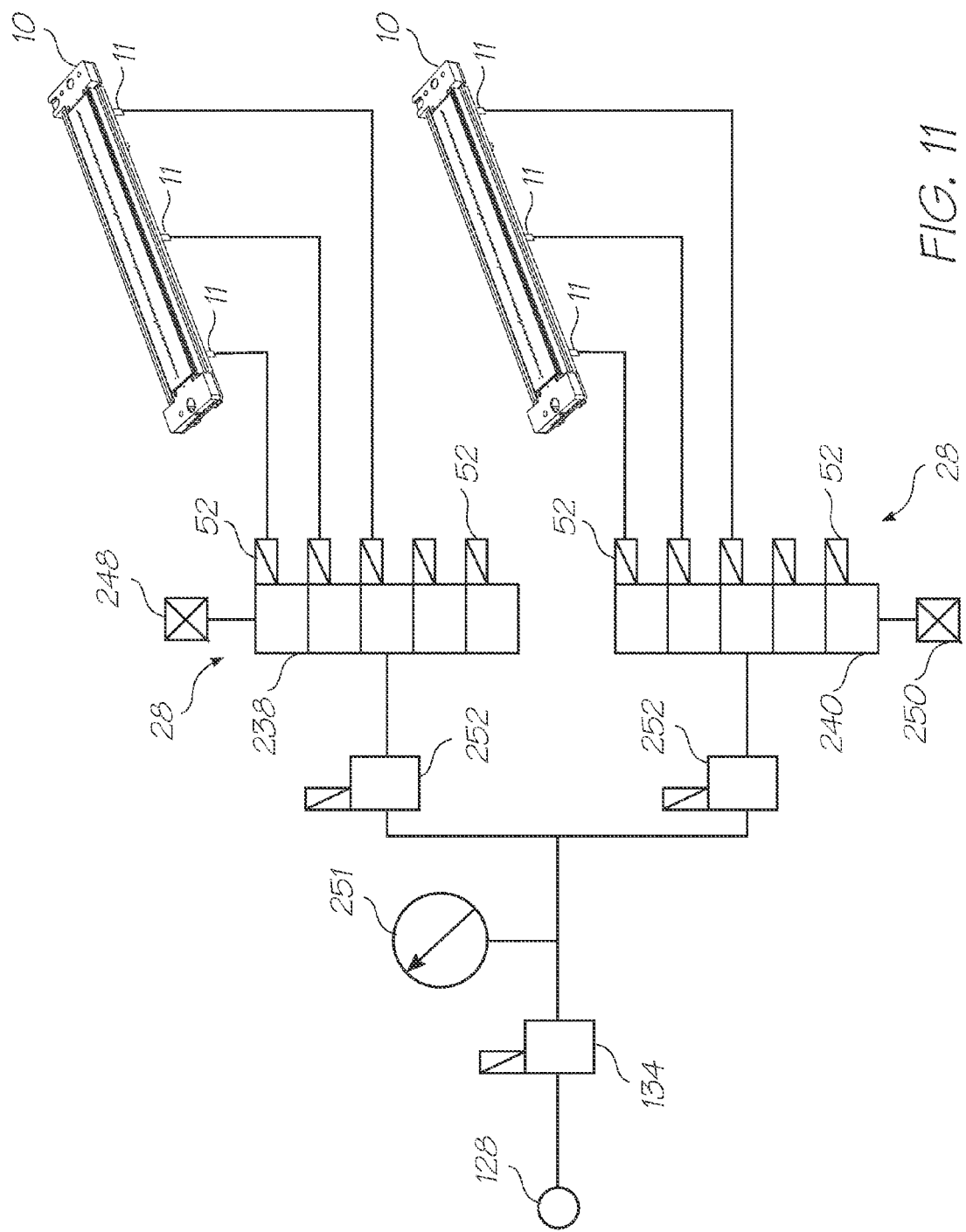
FIG. 11 shows an overview pneumatic circuit diagram for the leak tester of FIG. 3.

A broad overview of a pneumatic test circuit of the device is shown in FIG. 11. The test circuit has a main pressure inlet 128. A system isolation valve or main air isolation switch 134 (reference numeral 206 in FIG. 14) is positioned downstream of the inlet 128. A main pressure gauge or system pressure indicator 74 (reference numeral 258 in FIG. 14) is positioned downstream of the valve 134. Left and right isolation valves 252, 254 are connected in parallel to each other downstream of the system isolation valve 134.

Left and right spout arrangements 238, 240 are connected to respective isolation valves 252, 254 to receive pressurized air when the isolation valves 252, 254 are opened. Each arrangement 238, 240 has a number of the fluid supply outlets 52. Spouts 11 of respective carriers 10 are received and clamped in the outlets 52 of respective arrangements 238, 240.

Pressure transmitters 248, 250 are connected to respective arrangements 238, 240 to transmit pressure values to the controller 36 so that pressure decay in the carriers 10 can be determined.

Figure 14:
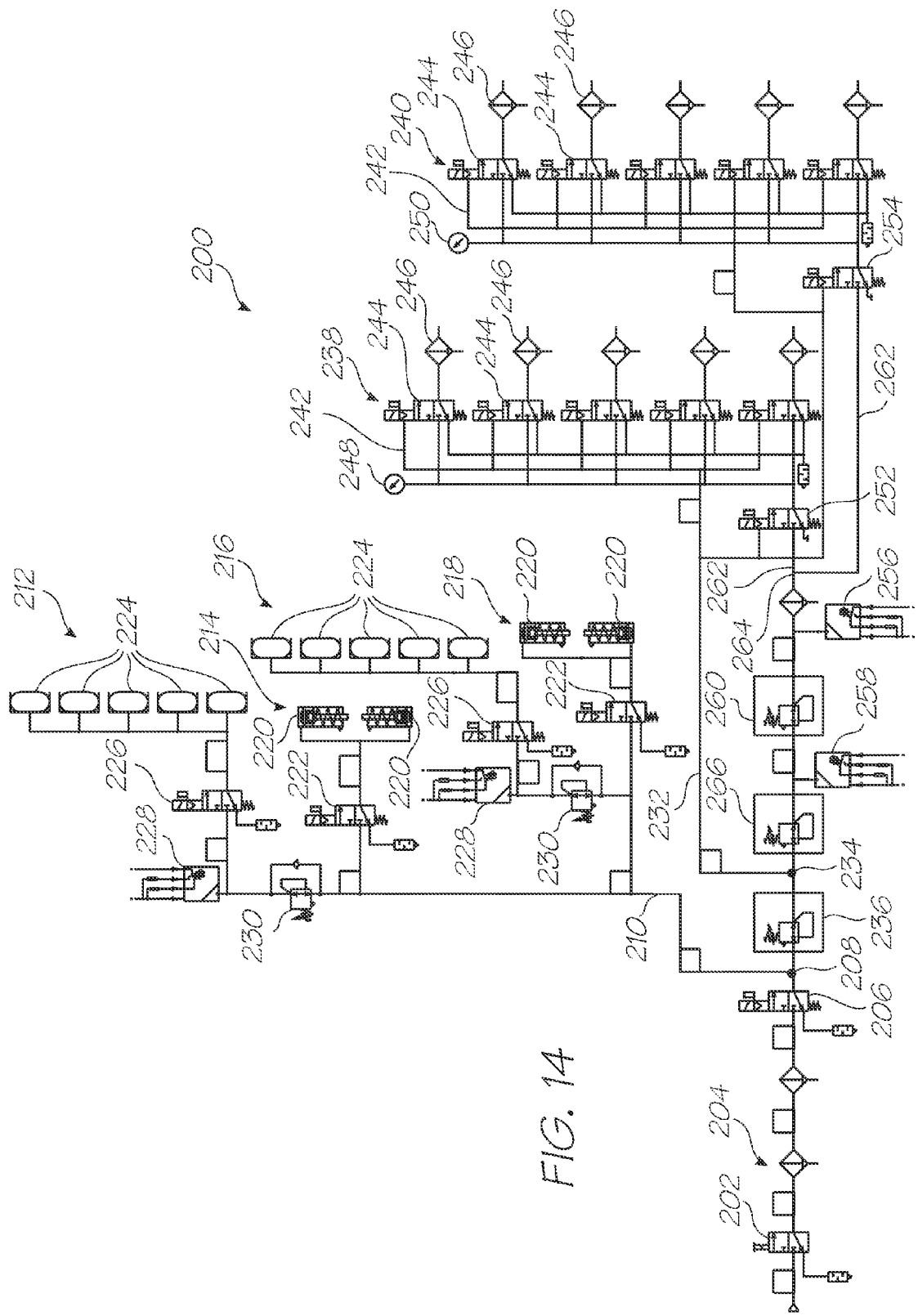
FIG. 14 shows a detailed pneumatic circuit diagram for the leak tester of FIG. 3.

The pneumatic circuit is shown in more detail in FIG. 14 and generally indicated with reference numeral 200. Air is supplied to the circuit via a manual isolation valve 202. After mist separation at 204, a system isolation valve 206 controls air supply to the circuit 200.

A take-off line 210 is connected downstream of the isolation valve 206 via a two-way connector 208. A right spout clamp arrangement 212 and a right clamp assembly 214 are connected in parallel to the line 210. A left spout clamp arrangement 216 and a left clamp assembly 218 are also connected in parallel to the line 210.

The spout clamp arrangements 212, 216 serve to clamp the spouts 52 also described above with reference to FIG. 4.

Each clamp assembly 214, 218 has two pairs of sleeve and piston actuators 220, each pair physically represented as 61 in FIG. 4. The actuators 220 are connected to the line 210 via respective solenoid valves 222. The valves 222 are connected to the controller 36 so that clamping of the carriers 10 can be initiated by the controller 36.

Each spout clamp arrangement 212, 216 has five pneumatic spout clamps 224, in the respective spouts physically indicated at 52 in FIG. 4. The spout clamps 224 are connected in parallel to the line 210, via respective solenoid valves 226 and pressure indicators/switches 228 in series.

Respective pressure regulators 230 interconnect the line 210 and each pressure indicator 228. The solenoid valves 226 and the indicators 228 are connected to the controller 36 so that pressure supplied to the spout clamps 224 is controlled.

A second take-off line 232 is connected downstream of the connector 208 via a two-way connector 234 and a pressure regulator 236. The second take-off line 232 supplies pressurized fluid to the left spout arrangement 238 and the right spout arrangement 240. Each spout arrangement 238, 240 has a manifold 242 with five solenoid valves 244 connected in parallel to the manifold 242. A filtered outlet 246 is connected to each valve 244 to supply filtered air to the carrier 10 via the spouts 11.

The pressure transmitters or pressure indicators/switches 248, 250 are connected in parallel to respective valves 244 of respective spout arrangements 238, 240 and in series to respective solenoid isolation valves 252, 254. The switches 248, 250 are connected to the controller 36 so that pressure applied at the spouts 11 can be recorded by the controller 36. The solenoid isolation valves 252, 254 are operatively connected to the controller 36 to facilitate operation of the valves 252, 254.

In turn, the isolation valves 252, 254 are connected in parallel to a test pressure indicator/switch 256. Thus, once the carrier 10 has been pressurized to a predetermined extent via the valves 244 using pressure feedback values from the pressure indicator 256, the valves 244 can be closed to the air supply. The indicators 248, 250 are connected to the controller 36 and are configured for feeding pressure values back to the controller 36 to determine whether, and to what extent, pressure decay is occurring.

A system pressure indicator/switch 258 is connected in series to the indicator 256 and is connected to the controller 36 to monitor system pressure. A pressure regulator 260 is interposed in series between the indicators 256, 258. A further pressure regulator 266 is interposed between the indicator 258 and the connector 234.

Return lines 262 are connected together at 264 upstream of the indicator 256 and connect to respective spout arrangements 238, 240 via respective solenoid isolation valves 252, 254.

It follows that the tester 26 has a pneumatic system and pressure measurement arrangement that comprises a number of sensors, valves, filters and regulators. Pressure sensors 74 and 124 (FIG. 7 and represented as the system pressure indicator 258 and the test pressure indicator 256 in FIG. 14) are digital compound pressure sensors. The sensors 74 and 124 are typically configured to measure both positive and vacuum pressure. The Inventor has found SMC ZSE40 digital pressure sensors to be suitable for this purpose.

Pressure regulator 76 (shown physically in FIG. 7 and represented as regulator 266 in FIG. 14) is an SMC IR series pressure regulator for primary regulation. Pressure regulator 104 (shown physically in FIG. 7 and represented as regulator 260 in FIG. 14) is a Fairchild 1000 series high precision pressure regulator for final regulation of the air supply to the respective cradles 28. Pressure regulators 82 and 98 (shown physically in FIG. 7 and represented as regulators 230 in FIG. 14) are used on the respective cradles 28, with pressure regulator 80 (represented as regulator 236 in FIG. 14) for pilot air pressure. These regulators 80, 82 and 98 are SMC AR 20K series regulators having a backflow mechanism to ensure a quick release of air pressure to release the carrier 10 from the cradle 28. Pressure sensors 78 and 100 (shown physically in FIG. 7 and represented as indicators 228 in FIG. 14) are SMC ISE40 digital pressure sensors.

Figure 8:
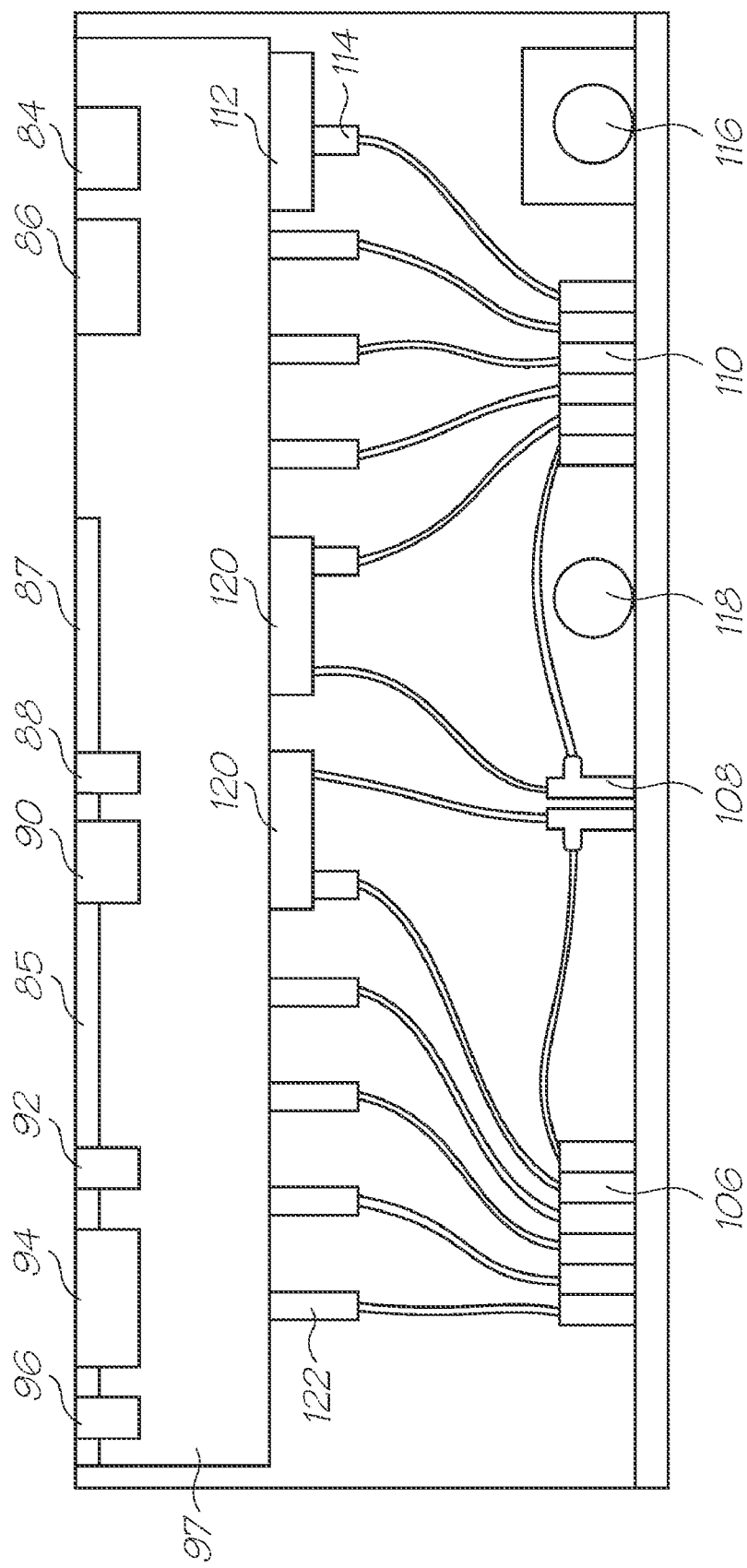
FIG. 8 shows a section top view from line A-A' of the open service panel of the leak tester of FIG. 7.

FIG. 8 shows a bottom portion of the panel shown in FIG. 7. Pressure transmitters 120 (represented as indicators 248, 250 in FIG. 14) are two GE PTX 1400 transmitters used in the respective cradles 28. These transmitters use an integral electronics system to provide a 2 wire 4 to 20 mA output proportional to the applied pressure.

Reference numerals 106, 108, and 110 refer to 3-port solenoid valves (referred to as solenoid valves 252, 254 and 244 in FIG. 14). The Inventor has found the SMC SYJ500 series 3-port, pilot operated solenoid valve to be suitable. These valves are base mounted 24V DC valves with surge voltage protection.

Reference numeral 112 indicates 5-port solenoid valves (referred to as solenoid valves 222, 226 in FIG. 14) to control the spout clamps 224. The Inventor has found the SMC SY3160 valves suitable. These valves are 24V DC body-ported, cassette type solenoid valves with fittings for a 6 mm air pipe.

Air filters 114 and 122 are used to remove any particles from the air before charging the carrier 10 with pressurized air. The Inventor has found SMC SF series inline air filters to be adequate for this purpose. Also included are mist separators 118 and micro-mist separator 116 to remove moisture from the pneumatic system. The Inventor has found the SMC AFM series mist separator suitable for 118, and the SMC AFD series mist separator suitable for 116.

Figure 9:
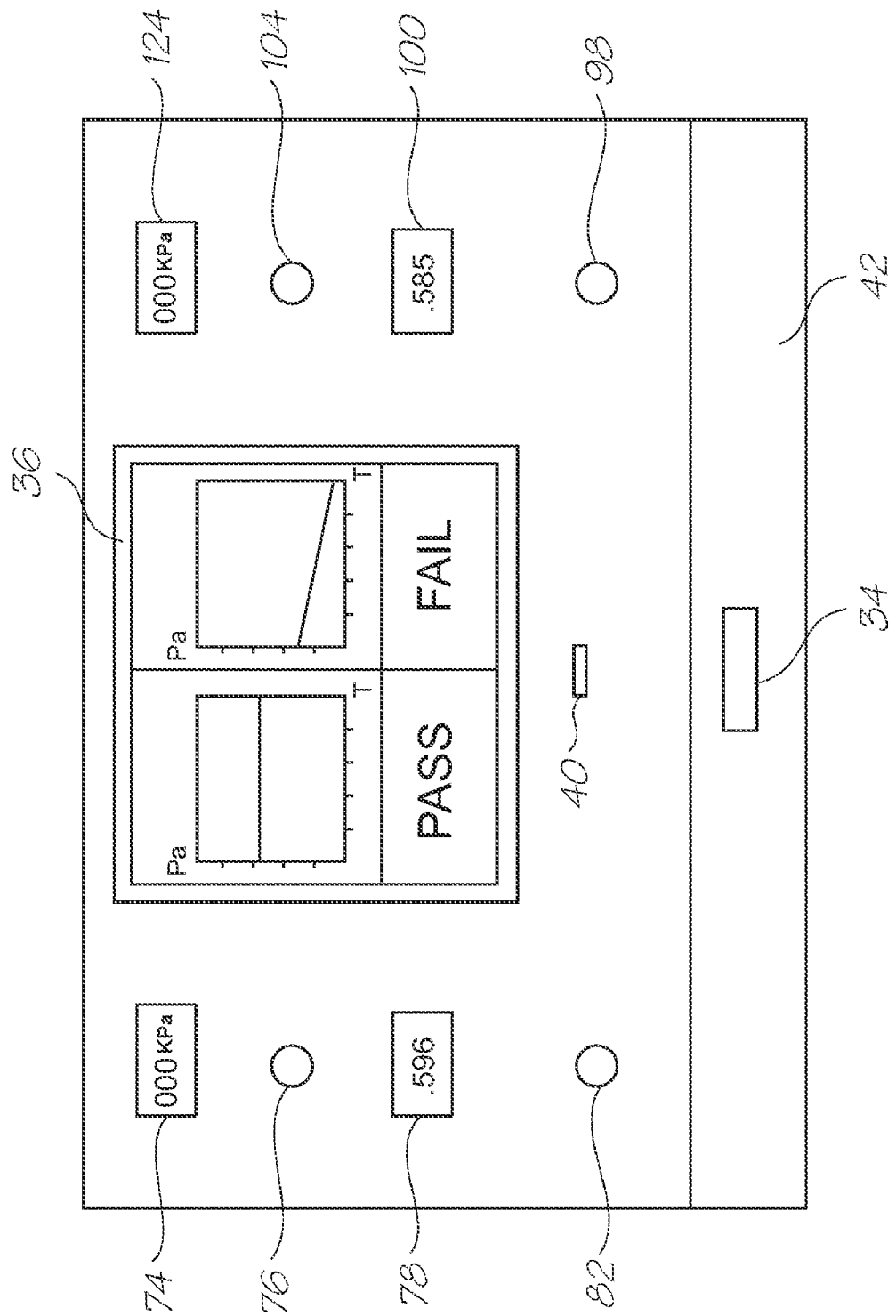
FIG. 9 shows a close-up frontal view of a touch panel controller of the leak tester of FIG. 3.
Figure 10:
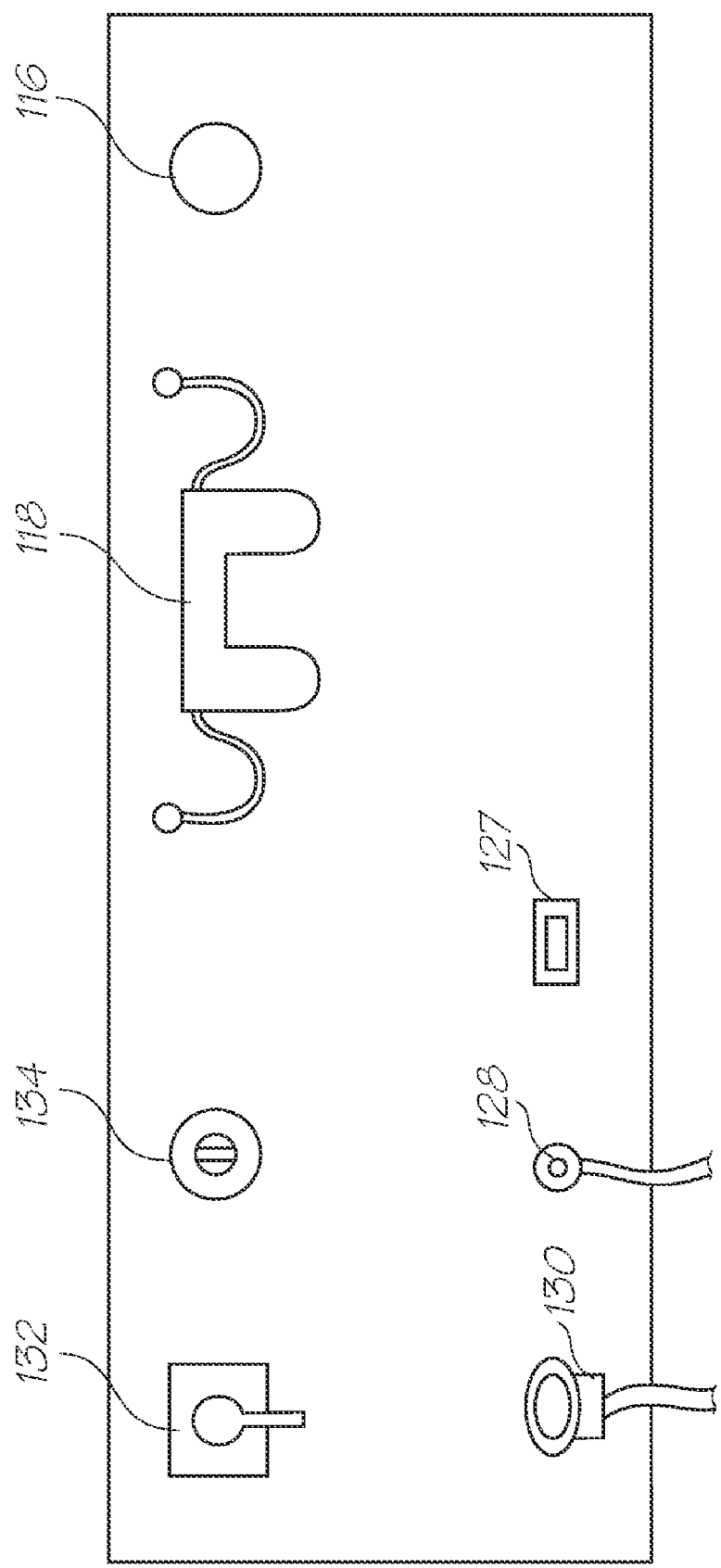
FIG. 10 shows a rear view of a services panel of the leak tester of FIG. 3.

FIG. 9 shows the components of FIG. 7 in front view. Like components are indicated by like reference numerals. Similarly, FIG. 10 shows an outside view of the components of FIG. 8, with like reference numerals indicating like components.

As shown, the tester 26 includes a mains AC power isolation switch 132 and the main air supply isolation switch 134. A mains power IEC connector 130 is also included, along with a 6 mm main air supply connector for connecting a pressurized fluid supply to the pneumatic system of the tester 26. An RJ45 connection 127 is also present, to connect the controller 36 to a remote monitoring system.

The remote monitoring system (not shown) interfaces with the tester 26 via the controller 36. The remote monitoring system is able to monitor the tester 26 to record the operations performed. Of particular use is that the remote monitoring system can monitor the barcodes of each carrier tested, along with the result of the pressure test so performed. For example, each carrier is scanned with the barcode scanner 34 before it is tested. The barcode is sent to the remote monitoring system, along with the test result.

This remote monitoring prevents inferior carriers from proceeding with subsequent processing, such as being fitted with printhead circuitry, as each carrier must typically be identified by its barcode before further processing thereof can take place.

Figure 12:
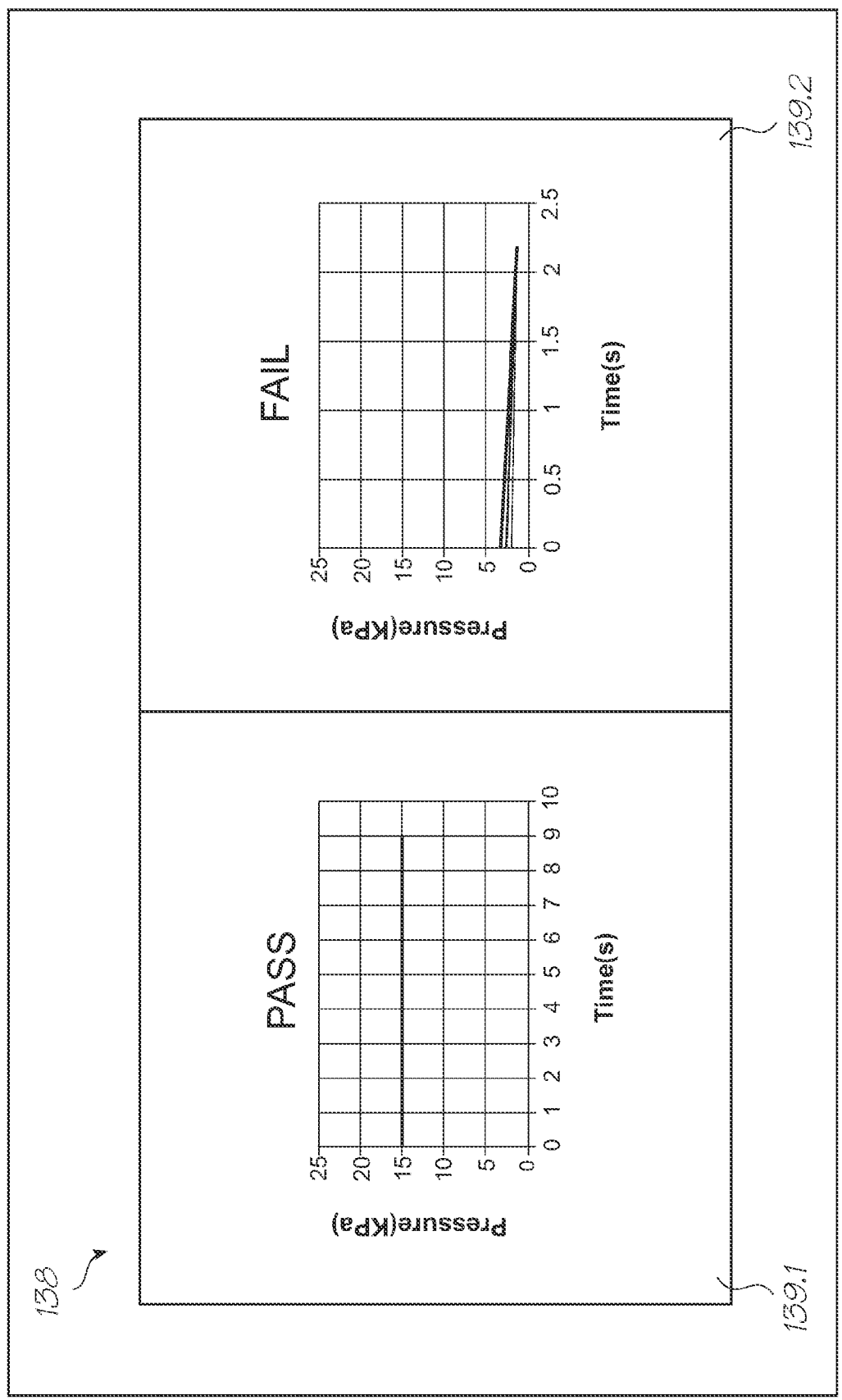
FIG. 12 shows an example of a graphic user interface displayed by the touch panel controller of FIG. 9.

FIG. 12 shows a graphical user interface (GUI) 138 which is typically displayed on the controller's touch panel display. As shown, the GUI 138 comprises two Cartesian graphs 139, one for each cradle 28. The graphs 139 indicate a pressure measurement along a Y-axis and time on an X-axis.

In the embodiment shown in FIG. 12, the left graph 139.1 shows a graph for a carrier 10 which has passed the pressure decay test. The carrier 10 is charged with pressurized fluid as described with reference to FIG. 14 and the controller 36 monitors the pressure decay over a predetermined period of time through its connection with the indicators 248, 250. If there is insignificant pressure decay, as shown by the horizontal line of graph 139.1, then the integrity of the fluid paths and laminate of the carrier 10 is confirmed.

Graph 139.2 shows the result of a failed pressure decay test on a carrier. As shown, the pressure in the carrier declines over time, which indicates that the integrity of the fluid paths or laminate is insufficient.

The tester 26 also includes a safety system to ensure safe operation thereof and to minimize damage to the carrier 10 and the tester 26, as well as harm to the operator. It is to be appreciated that the safety system is typically implemented via the controller 36.

As such, the controller 36 is linked to a number of regulators, as described above, which include sensors or indicators, as described earlier, for monitoring air pressure. An incorrect pressure typically indicates an undesirable operational status of the tester 26, and the controller 36 can deactivate the tester 26 and its components to prevent damage and/or harm.

As such, each cradle 28 may include a sensor which senses a position of the clamping mechanism 54 and reports it to the controller 36. If the carrier 10 is not correctly located in the cradle 28, then the controller 36 prevents the clamping mechanism 54 from damaging the carrier 10.

A person skilled in the art will appreciate that the controller 36 may be configured to monitor features relating to the operational status of the tester 26. This is achieved by processing feedback data received from the indicators described with reference to FIG. 14. For example, the controller 36 can monitor a condition of the engagement mechanism 54, as described above, the fluid pressure applied by the fluid pressure application arrangement of the tester 26, a presence of the carrier 10 in the cradle 28, etc. In one embodiment, the barcode scanner 34 can be used to verify an authenticity of the carrier 10. For example, as explained above, the remote monitoring system monitors the respective carriers. If a carrier is scanned with the scanner 34, the remote monitoring system is able to verify whether or not that particular carrier has passed or cleared all the preceding manufacturing processes. If the carrier has an invalid barcode, the controller 36 will notify the operator and not test the carrier.

Similarly, the controller 36 is able to monitor an electricity or air supply to the tester 26 for undesired levels, or the like. The controller 36 is also typically configured so that the operator is required to key in an operator identifier for identification purposes, so that a record can be kept of which operator tested which carrier, or the like.

Figure 13:
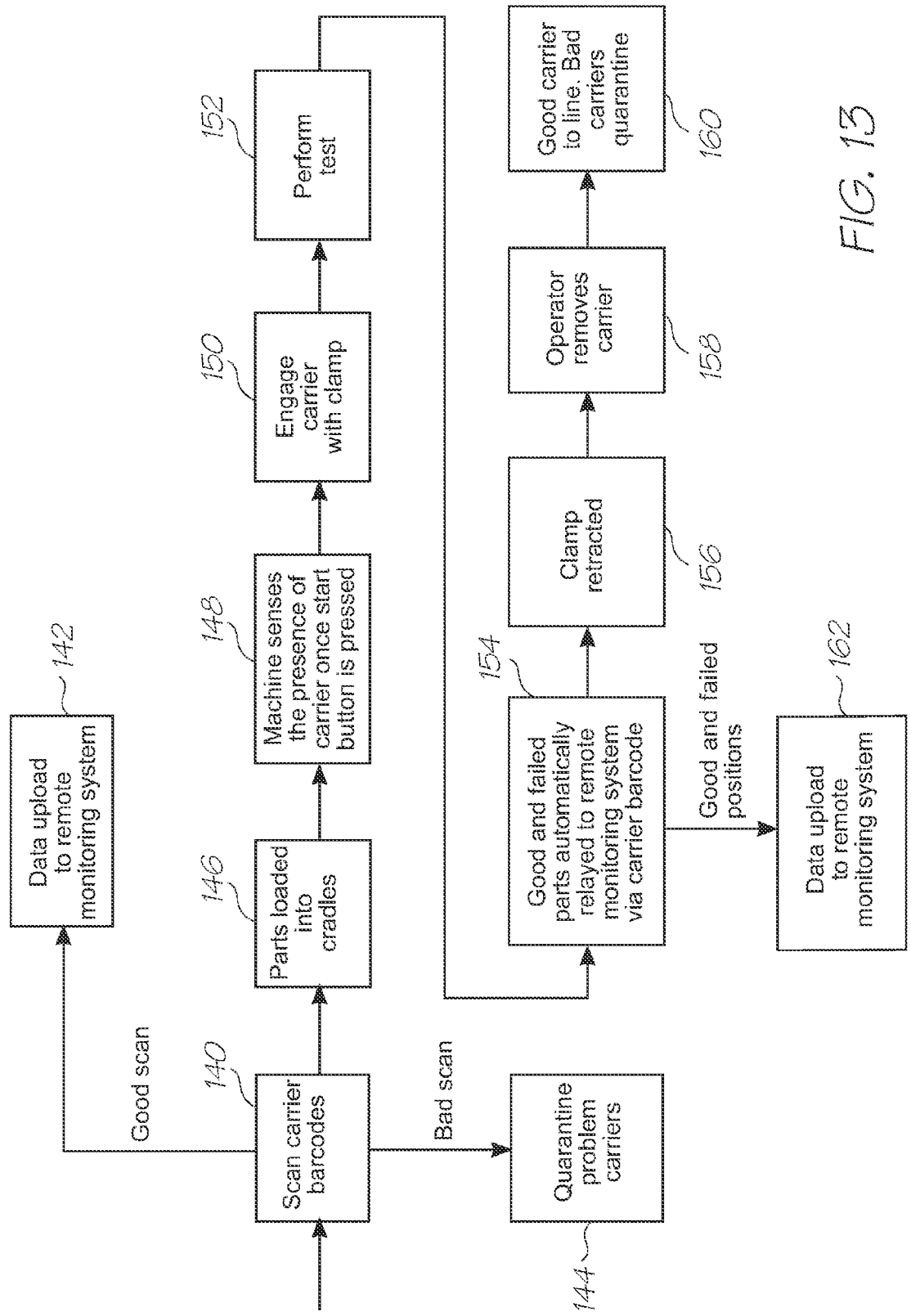
FIG. 13 shows a block diagram of a method of testing the carrier with the leak tester, in accordance with the invention.

FIG. 13 shows a diagram for a method, in accordance with one embodiment of the invention, of testing the integrity of the carrier 10 with the tester 26. The blocks in the diagram may indicate steps performed by the operator or by the controller 36 of the tester 26.

It is to be appreciated that reference to a reference numeral representing a particular method step refers to a respective block indicated by such reference numeral in the accompanying drawings. As such, the method included in the invention is not limited or constrained to particular method steps referred to in this manner. A skilled person will understand that further methods are possible under this invention which might exclude some of these steps or include additional steps.

In general, the method commences with the operator scanning the barcode of the carrier 10 with the scanner 34 of the tester 26, shown at block 140. If the scan is successful, the identity of the carrier, as established by the barcode, is transmitted to the remote monitoring system, as shown at block 142. If the scan is unsuccessful, perhaps due to a damaged barcode, the carrier 10 is quarantined for later examination, as at block 144.

The operator then proceeds to place the carrier 10 in the cradle 28, indicated at block 146. At block 148, the operator presses the start button once the carrier 10 is properly loaded. The controller 36 senses whether or not the carrier 10 is properly located in the cradle 28. If the carrier 10 is properly positioned, the controller 36 engages the carrier with the clamping mechanism 54, shown at block 150. If the carrier is not correctly positioned in the cradle, the controller 36 will typically notify the operator via the display screen.

Once the carrier 10 is clamped in the cradle 28, the controller 36 performs the pressure decay test at 152 by charging the carrier with pressurized air via the fluid supply outlets 52 in the cradle 28. The pressure sensors, as described above, in communication with these outlets 52 enable the controller 36 to monitor the pressure in the carrier for a predetermined period of time. For example, the controller 36 charges the carrier with pressurised air until a predetermined pressure is reached, whereafter the pressure in the carrier is monitored by the pressure sensors for, say, 5 seconds. If no appreciable pressure decay is sensed, the integrity of the carrier is sound.

Once the test is completed, the controller 36 is able to report the results thereof directly to the remote monitoring system via the RJ45 connector 126, as described above, shown at block 154. That data is uploaded to the remote monitoring system at 162. The results are also shown to the operator via the display screen of the controller 36. After the test, the controller 36 releases the clamping mechanism 54 at 156 so that the operator is able to remove the carrier from the cradle 28, shown at block 158. If the carrier passed the test, the operator allows it proceed to the next step in the manufacturing process, otherwise the carrier is placed in quarantine for later examination. This is shown in block 160.

It is to be appreciated that the invention also includes a software product for execution by the controller 36 of the leak tester 26, as described above. The software product enables the leak tester to perform the functions and relevant method steps described above. The invention inherently includes a memory, such as a magnetic or optical disc, incorporating such a software product.

The invention claimed is:

1. A pneumatic assembly for a pressure decay tester of printhead integrated circuits, the assembly comprising
   a pressurized air supply;
   a pneumatic clamping arrangement in fluid communication with the pressurized air supply for clamping a carrier for the printhead integrated circuits such that the carrier is in fluid communication with the printhead integrated circuits;
   a valve arrangement to apply a predetermined pressure to the carrier;
   a sensing arrangement to sense a static pressure in the carrier; and
   a control system in communication with the clamping, valve and sensing arrangements to control operation thereof and to generate a discernible signal representing said static pressure such that a decay in said static pressure can be determined.

2. A pneumatic assembly as claimed in claim 1 which the valve arrangement includes spout clamp valves operatively connected to the control system to control operation of the spout clamps.

3. A pneumatic assembly as claimed in claim 1, in which the pneumatic clamping arrangement includes a support on which the carrier is supported, the clamping arrangement being configured so that, when actuated, the carrier is urged against the support.

4. A pneumatic assembly as claimed in claim 3, in which the support defines air supply openings in which air inlet spouts of the carrier are received in use.

5. A pneumatic assembly as claimed in claim 4, in which the clamping arrangement includes pneumatic spout clamps positioned in the support to clamp the spouts in position.

6. A pneumatic assembly as claimed in claim 4, in which the valve arrangement includes an air supply isolation valve operatively connected to the control system to isolate the air supply openings from the pressurized air supply during determination of said static pressure.

7. A pneumatic assembly as claimed in claim 6, in which the sensing arrangement includes a pressure transmitter operatively connected to the control system to communicate pressure values upstream of the isolation valve to the control system.

* * * * *